US008082230B1

(12) United States Patent
Root

(10) Patent No.: US 8,082,230 B1
(45) Date of Patent: Dec. 20, 2011

(54) SYSTEM AND METHOD FOR MOUNTING A FILE SYSTEM ON MULTIPLE HOST COMPUTERS

(75) Inventor: Michael E. Root, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 618 days.

(21) Appl. No.: 11/644,765

(22) Filed: Dec. 22, 2006

(51) Int. Cl.
*G06F 7/00* (2006.01)
*G06F 17/30* (2006.01)

(52) U.S. Cl. .................................. 707/661; 707/822

(58) Field of Classification Search .................. None
See application file for complete search history.

(56) References Cited

U.S. PATENT DOCUMENTS

| | | | |
|---|---|---|---|
| 5,603,019 A | | 2/1997 | Kish |
| 5,758,334 A | | 5/1998 | Knight, III et al. |
| 5,889,952 A | * | 3/1999 | Hunnicutt et al. ............ 709/219 |
| 6,081,807 A | * | 6/2000 | Story et al. .................... 709/219 |
| 6,105,016 A | * | 8/2000 | Martin ............................... 1/1 |
| 6,122,629 A | * | 9/2000 | Walker et al. ................. 707/613 |
| 6,128,717 A | * | 10/2000 | Harrison et al. ............. 711/202 |
| 6,564,219 B1 | * | 5/2003 | Lee et al. ...................... 707/769 |
| 6,665,815 B1 | * | 12/2003 | Goldstein et al. ............... 714/20 |
| 6,678,809 B1 | * | 1/2004 | Delaney et al. ............... 711/162 |
| 6,948,089 B2 | * | 9/2005 | Fujibayashi .................. 714/6.3 |
| 6,950,833 B2 | | 9/2005 | Costello et al. |
| 7,328,226 B1 | | 2/2008 | Karr et al. |
| 7,366,742 B1 | * | 4/2008 | Umbehocker et al. ................ 1/1 |
| 7,395,378 B1 | | 7/2008 | Pendharkar et al. |
| 7,404,051 B2 | | 7/2008 | Shitomi |
| 2003/0158873 A1 | * | 8/2003 | Sawdon et al. ............... 707/204 |
| 2003/0182389 A1 | * | 9/2003 | Edwards ....................... 709/213 |
| 2005/0216788 A1 | * | 9/2005 | Mani-Meitav et al. ........... 714/6 |

OTHER PUBLICATIONS

Alexandre Delcayre, "Disk-based backup and restore: reaching the next level", CNET Networks, Inc., Oct. 8, 2004, 3 pages; http://whitepapers.zdnet.com/abstract.aspx?docid=279024.
Paul Feresten, "Comparing Host-Based D2D to VTLs for Backup and Restore", Computer Technology Review, Feb. 4, 2005, 3 pages, http://www.wwpi.com/index.php?option=com_content&task=view&id=118&Itemid=44.

* cited by examiner

*Primary Examiner* — Charles Rones
*Assistant Examiner* — Daniel Kuddus
(74) *Attorney, Agent, or Firm* — Meyertons, Hood, Kivlin, Kowert & Goetzel, P.C.

(57) ABSTRACT

Various embodiments of a system and method for enabling multiple computers to mount a file system are described herein. The file system may be mounted on one computer, and a snapshot copy of the file system may be created and mounted on a second computer. Data for a particular file in the file system may be stored at particular storage locations on a storage device. In response to a read request to access data for the particular file through the file system, the data stored at the particular storage locations may be read and returned. Similarly, in response to a read request to access data for the particular file through the snapshot copy of the file system, the data stored at the particular storage locations may be read and returned.

18 Claims, 10 Drawing Sheets

SYSTEM AND METHOD FOR MOUNTING A FILE SYSTEM ON MULTIPLE HOST COMPUTERS

BACKGROUND OF THE INVENTION

1. Field of the Invention

This invention relates generally to file systems. More particularly, the invention relates to a system and method for mounting a file system on multiple host computers.

2. Description of the Related Art

Computer systems generally store files on storage devices such as disk drives, tape drives, or optical drives, where the files are organized as a file system. File systems typically use directories or folders so that each file is located in one of the directories. The directories are often organized as a hierarchy. For example, a file system may have a root directory, the root directory may have sub-directories, and the sub-directories of the root directory may in turn have sub-directories, etc. Each file in the file system may have a pathname that specifies the hierarchical sequence of directories that lead to the file.

Software applications executing on the computer system typically request the file system to create files and write data to the files. The data written to the files is also referred to herein as user data. In addition to the user data that is written to the files, the file system also maintains metadata for managing the user data. For example, the metadata may include file descriptors, e.g., inodes or other data structures, that correspond to the various files in the file system. The inode for a file stores information about the file, such as the number of bytes in the file, protection and permission information, a link count that specifies the number of hard links to the file, storage locations of data blocks for the file's user data, the dates and times when the file was created, last accessed, and modified, etc.

Each directory may have a table of directory entries that maps the names of the files in that directory to their corresponding metadata (e.g., inodes or other file descriptors). A software application may access a file if it knows the pathname of the file. For example, the sequence of directories leading to the file may be traversed until the file's directory is reached, and the table of directory entries for the file's directory may be consulted to map the name of the file to the file's corresponding inode or other metadata. The file's metadata may then be accessed, and the information stored therein may be used to access the file's user data. For example, as noted above, the metadata may specify storage locations, e.g., addresses, of data blocks (e.g., data blocks on a disk drive or other storage device) that hold the file's user data. Thus, the data blocks may be accessed, for example, to read data from the file or to append new data to the file.

In some applications it would be desirable to mount a file system on multiple computer systems. However, two different computer systems typically cannot mount the same file system without introducing the potential for corrupting the file system or returning the wrong data on a file read.

SUMMARY

Various embodiments of a system and method for mounting a file system are disclosed. The file system may include metadata for managing user data stored in a plurality of files. According to one embodiment of the method, the file system may be mounted on a first computer. Mounting the file system enables access to the plurality of files through the file system.

A snapshot copy of the file system may be created, and the snapshot copy of the file system may be mounted on a second computer. Mounting the snapshot copy of the file system enables access to the plurality of files through the snapshot copy of the file system. For example, the plurality of files may include a first file having user data stored at selected storage locations specified by the metadata of the file system. In response to the snapshot copy of the file system receiving a read request to access the first file, the user data stored at the selected storage locations may be read.

BRIEF DESCRIPTION OF THE DRAWINGS

A better understanding of the invention can be obtained when the following detailed description is considered in conjunction with the following drawings, in which.

Figure 1:
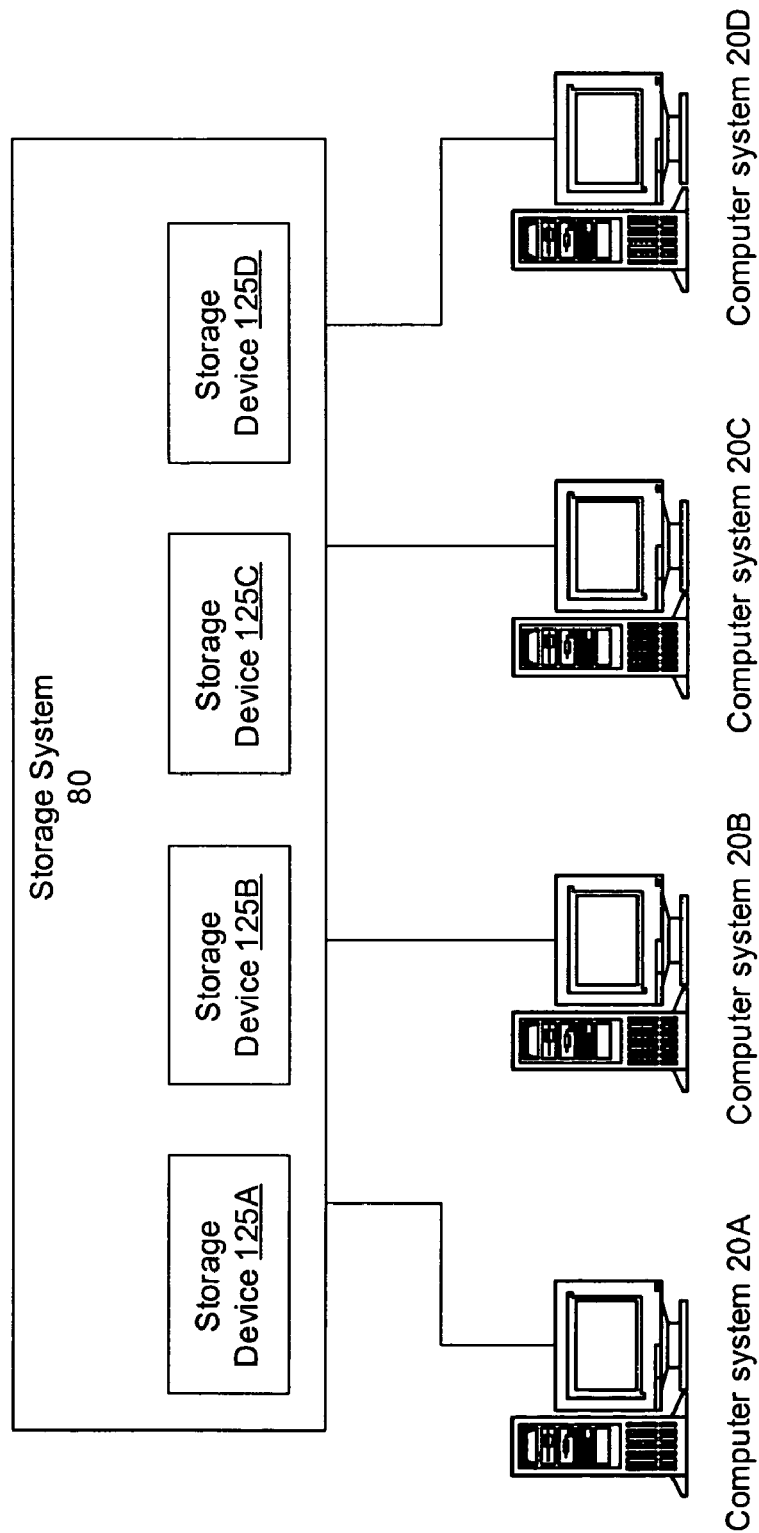
FIG. 1 illustrates an exemplary system in which a file system is mounted on multiple computer systems.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for enabling multiple computers to mount a file system are described herein. The file system may be mounted on one computer, and a snapshot copy of the file system may be created and mounted on a second computer. As described in detail below, the snapshot copy of the file system may be created without copying the user data for the files in the file system. For example, the user data for a first file in the file system may be stored at particular storage locations, e.g., storage locations on a storage device. In response to a read request to access user data for the first file through the file system, the data stored at the storage locations may be read and returned.

Similarly, in response to a read request to access user data for the first file through the snapshot copy of the file system, the data stored at the storage locations may be read and returned. Thus, the exact same data stored at the same storage locations is returned whether the file is accessed through the file system mounted on the first computer or the snapshot copy of the file system mounted on the second computer.

FIG. 1 illustrates an exemplary system in which multiple computers 20 are coupled to a storage system 80. In various embodiments, the storage system 80 may include any kind of system or device having one or more storage devices 125. Files of a file system may be stored on the one or more storage devices 125 in the storage system 80. One of the computers 20 may mount the file system, and one or more of the other computers 20 may mount snapshot copies of the file system.

Figure 2:
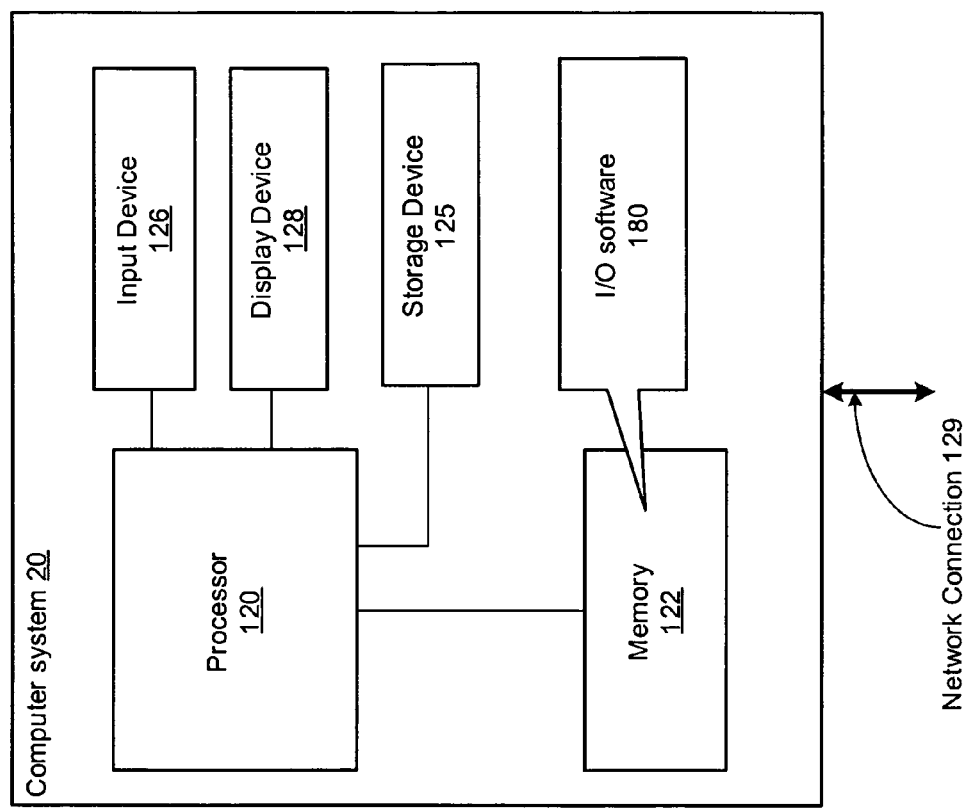
FIG. 2 illustrates one embodiment of the computer systems illustrated in FIG. 1.

FIG. 2 illustrates an exemplary computer system 20 according to one embodiment. The computer system 20 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store I/O software 180, which may be executed by the processor 120. The I/O software 180 may be operable to perform input/output operations to read data from and/or write data to the files in a file system (or snapshot copy of a file system). The I/O software 180 may also implement the methods described below for mounting and using a snapshot copy of the file system. In some embodiments the I/O software 180 may execute in conjunction with storage system software 184 executing on the storage system 80, as described below. In various embodiments, the I/O software 180 and storage system software 184 may include any of various types of software for performing input/output operations, such as file system software, volume manager software, etc.

It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the computer system 20 may include multiple processors 120.

The computer system 20 may also include one or more input devices 126 for receiving user input from a user of the computer system 20. The input device(s) 126 may include any of various types of input devices, such as keyboards, keypads, microphones, or pointing devices (e.g., a mouse or trackball).

The computer system 20 may also include one or more output devices 128 for displaying output to the user. The output device(s) 128 may include any of various types of output devices, such as LCD screens or monitors, CRT monitors, etc.

The computer system 20 may also include a network connection 129 through which the computer system 20 couples to the storage system 80 and possibly also to other computer systems 20. The network connection 129 may include any type of hardware for coupling the computer system 20 to a network, e.g., depending on the type of network. In various embodiments, the computer systems 20 may be coupled to the storage system 80 and/or coupled to each other via any type of network or combination of networks. For example, the network may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each computer 20 may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 3:
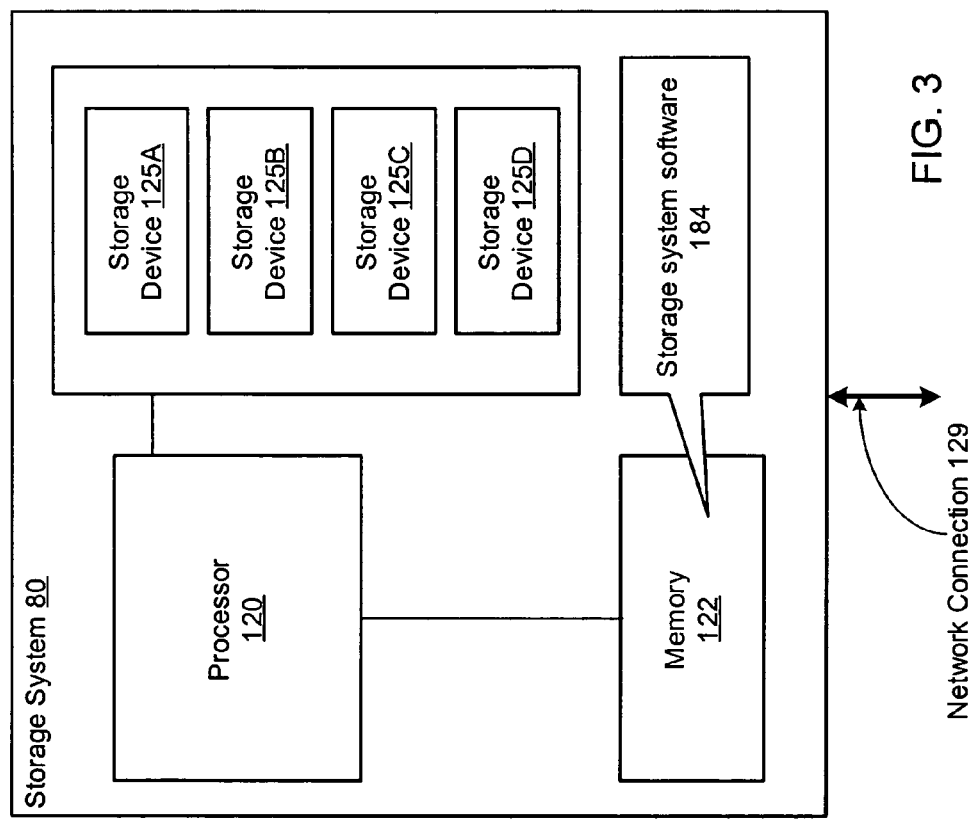
FIG. 3 illustrates one embodiment of the storage system illustrated in FIG. 1.

FIG. 3 illustrates an exemplary storage system 80 according to one embodiment. As described above, the storage system 80 includes one or more storage devices 125, e.g., storage devices configured to store data in a stable or non-volatile manner. In various embodiments the storage devices 125 may include any of various kinds of storage devices, such as optical storage devices or storage devices that utilize magnetic media, e.g., one or more hard drives or tape drives. For example, in one embodiment, the storage devices 125 may be implemented as one or more hard disks configured as a disk storage system.

In the illustrated embodiment, the storage system 80 includes a processor 120 coupled to a memory 122. The memory 122 may store storage system software 184, which is executed by the processor 120. The storage system software 184 may store data on and/or read data from the storage devices 125, e.g., in response to a request from the I/O software 180 executing on a computer 20.

Although FIGS. 1-3 illustrate an embodiment in which the computers 20 couple to a shared storage system 80 on which files in a file system are stored, in other embodiments the computers 20 may not couple to a shared storage system 80. For example, in one embodiment each computer 20 may have its own separate storage device(s) 125, e.g., such as illustrated in FIG. 2. Thus, instead of storing the files in a file system on a shared storage system 80, the files may be stored on the storage device 125 of one of the computers 20. A second computer 20 may mount a snapshot copy of the file system. In response to read requests to access files through the snapshot copy of the file system, the second computer 20 may communicate with the first computer 20 on which the original file system is mounted in order to read the data from the storage device 125 of the first computer 20.

Figure 4:
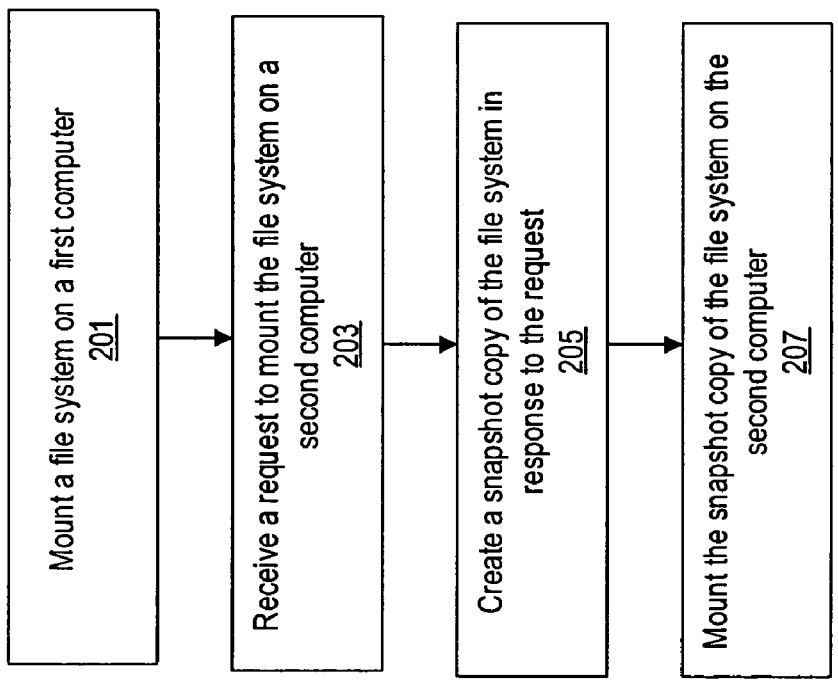
FIG. 4 is a flowchart diagram illustrating one embodiment of a method for mounting a file system on two computers.

FIG. 4 is a flowchart diagram illustrating one embodiment of a method for mounting a file system on two computers. In 201, the file system may be mounted on a first computer. The file system includes metadata for managing user data stored in a plurality of files. Mounting the file system enables access to the plurality of files through the file system. For example, the file system may provide an application programming interface (API) through which various application programs executing on the first computer can perform read requests to read data from files in the file system and/or write requests to write data to files in the file system.

In 203, a request to mount the file system on a second computer, or a request to mount a snapshot copy of the file system on the second computer, on a second computer may be received. For example, an application program executing on the second computer may call an API provided by the I/O software 180 in order to request that the file system be mounted on the second computer.

In response to the request to mount the file system on the second computer, a snapshot copy of the file system may be created, as indicated in 205. The snapshot copy of the file system (also referred to herein as the snapshot file system) is a point-in-time representation of the file system at the snapshot copy time is created. Thus, the snapshot file system represents the state of the file system at the time the snapshot file system is created.

The snapshot file system is preferably performed without copying the user data of the file system. As described below, in one embodiment, creating the snapshot file system may comprise creating an instant snapshot without copying either the user data or the metadata of the file system. In another embodiment, the metadata of the file system may be copied to the snapshot file system, but the user data is not copied.

In 207, the snapshot copy of the file system may be mounted on the second computer. Mounting the snapshot copy of the file system enables access to the plurality of files through the snapshot copy of the file system. For example, various application programs executing on the second computer may perform read requests to read data from files through the snapshot copy of the file system.

Thus, the method of FIG. 4 may enable the file system to be mounted on the first computer at the same time a snapshot copy of the file system is mounted on the second computer. It is noted that in further embodiments, additional snapshot file systems may be mounted on other computers, e.g., so that a plurality of snapshot file systems are mounted on a plurality of different computers.

In one embodiment, the second computer may only use the snapshot file system for reading data from the files, but may not write data to the files through the snapshot file system. For example, the snapshot file system may be mounted on the second computer for read accesses only. The first computer may be able to read data from the files and/or write data to the files. For example, the file system may be mounted on the first computer for read accesses and/or write accesses. However, the user data in the files may be of a fixed nature such that once the snapshot file system is created, the user data is not changed. However, as described below, in some embodiments the first computer may still add new data to the file system, e.g., by creating new files, even after the snapshot file system has been created.

Figure 5:
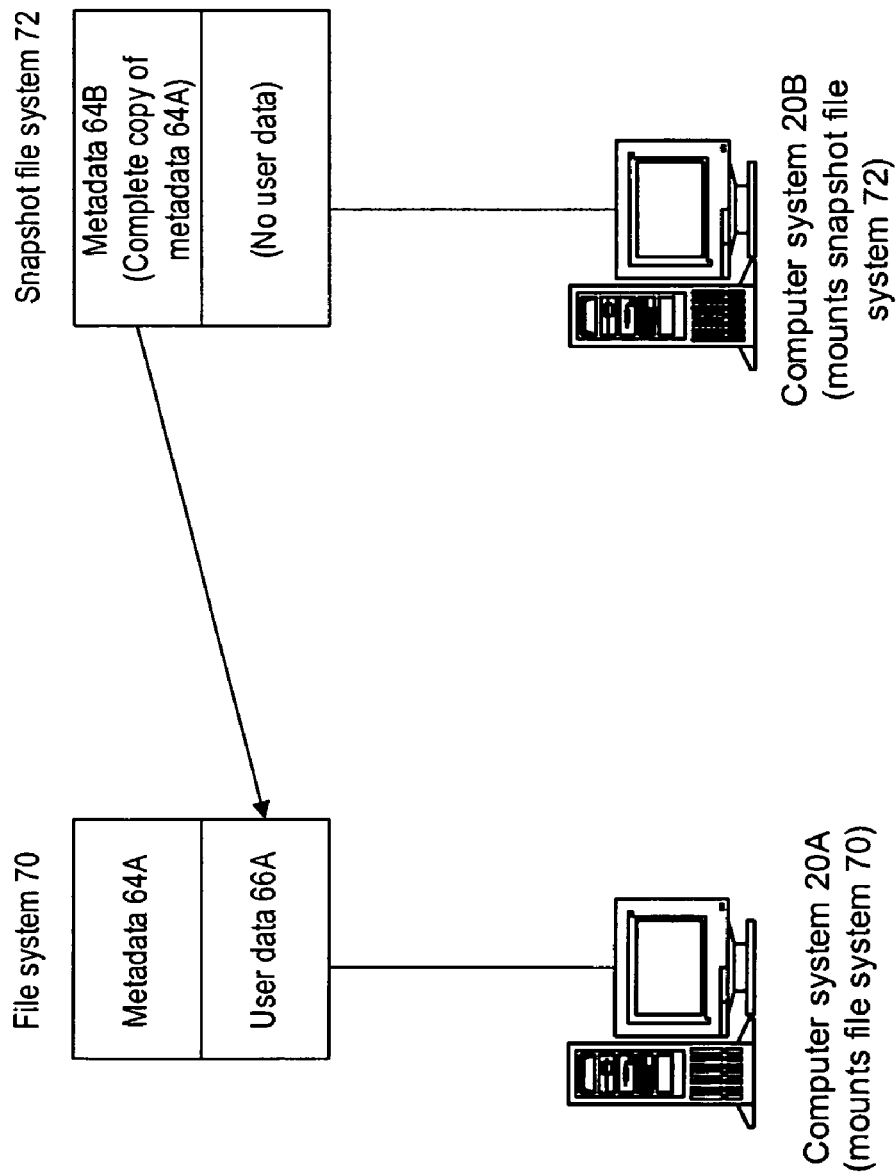
FIG. 5 illustrates an embodiment in which a computer system mounts a file system that is already mounted on another computer system by copying metadata, but not user data, of the file system.

FIG. 5 illustrates an embodiment in which a file system 70 is mounted by a computer system 20A for writing and/or reading. As shown, the file system 70 includes metadata 64A and user data 66A. In response to a request from the computer system 20B to mount the file system 70 for reading, a snapshot file system 72 is created, i.e., a snapshot copy of the file system 70. In this embodiment, the snapshot file system 72 includes its own metadata 64B, which is a complete copy of the metadata 64A of the file system 70. For example, when the snapshot file system 72 is created, space for the metadata 64B may be allocated, and the metadata 64A may be copied into the allocated space. However, the snapshot file system 72 does not include a separate copy of the user data. Instead, the metadata 64B (the copy of the metadata 64A) references the user data 66A of the original file system 70. Thus, the user data 66A of the original file system 70 may be returned in response to read requests received by the snapshot file system 72.

For example, suppose that the file system 70 includes a first file having user data stored at selected storage locations. The metadata 64A includes metadata that specifies the storage locations at which the user data for the first file is stored. For example, the metadata 64A may specify logical or physical addresses or other storage locations at which the user data for the first file is stored. Thus, the metadata 64B also specifies the storage locations at which the user data for the first file is stored, since the metadata 64B is a copy of the metadata 64A. In response to a read request to access the first file, the metadata 64B may be accessed. More particularly, the portion of metadata 64B that corresponds to the first file and specifies the storage locations at which the user data for the first file is stored may be accessed. The user data stored at the specified storage locations may then be read. Thus, the snapshot file system 72 may effectively enable the second computer to access the files in the file system 70 while the file system 70 is already mounted on the first computer and without creating a separate copy of the user data.

Figure 6:
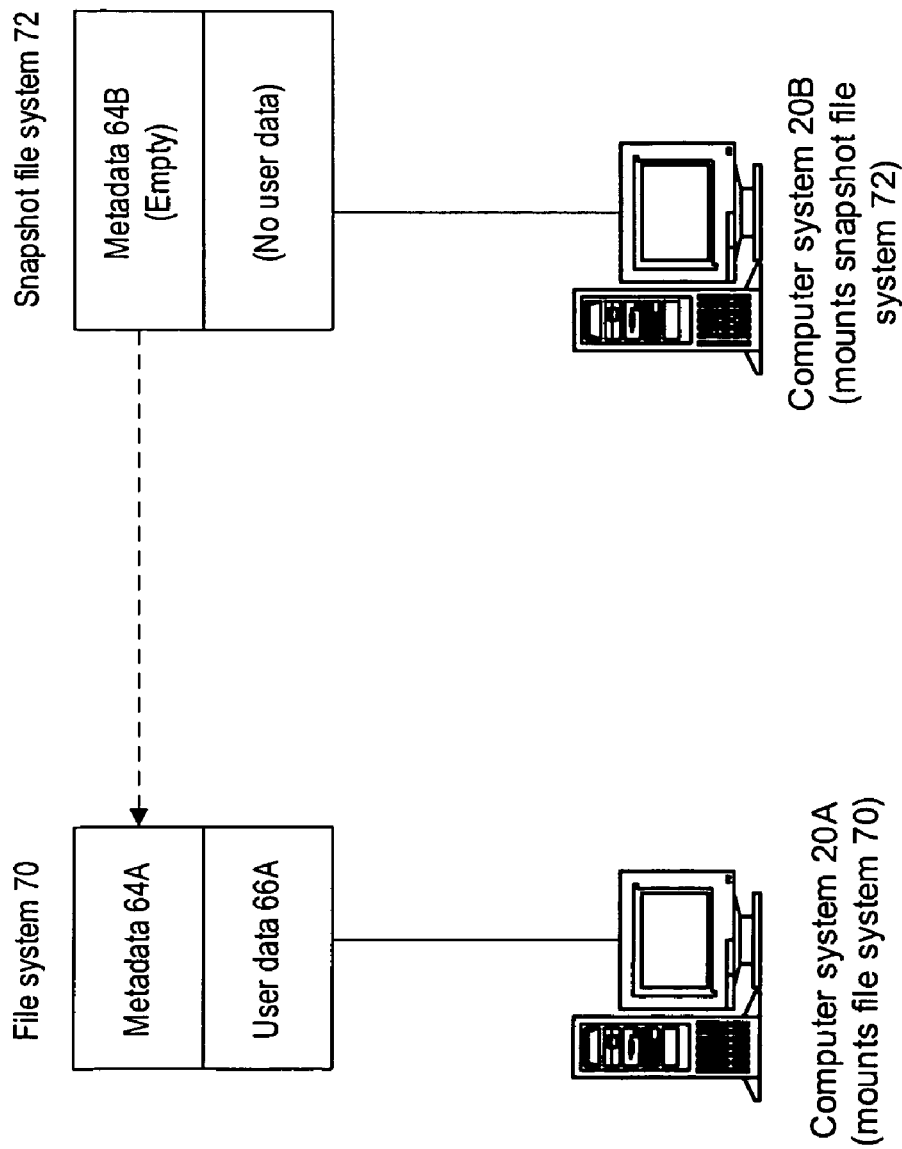
FIG. 6 illustrates an embodiment in which a computer system mounts a file system that is already mounted on another computer system by creating an instant snapshot of the file system, without copying either metadata or user data of the file system.

FIG. 6 illustrates another embodiment in which a file system 70 is mounted by a computer system 20A for writing and/or reading. In response to a request from the computer system 20B to mount the file system 70 for reading, a snapshot file system 72 is created. As described above, the snapshot file system 72 is created without copying the user data 66A. However, in this embodiment, the snapshot file system 72 is also created without copying the metadata 64A. For example, the snapshot file system 72 may be created by creating an instant snapshot of the file system 70. For example, the instant snapshot may be created by simply creating one or more data structures for managing the snapshot file system 72, such as a map table as described below. In some embodiments, creating the instant snapshot may also comprise allocating space for metadata 64B, which may be filled in later, as described below. Thus, in the embodiment shown in FIG. 6, the snapshot copy of the file system may be created very quickly without copying either metadata or user data from the original file system.

When a request to read a file through the snapshot file system 72 is received, metadata corresponding to the file may be read from the metadata 64A for the file system 70. Thus, the metadata needed for accessing files through the snapshot file system 72 may be read from the metadata 64A for the original file system 70 as necessary.

In some embodiments the computer system 20A may add new user data to the user data 66A in the file system 70 after the instant snapshot copy of the file system has been mounted on the computer system 20B. For example, the computer system 20A may add one or more new files to the file system 70. Adding new user data to the user data 66A may require changes to the metadata 64A in the file system 70. In this situation, the portion of metadata 64A which is required to change may be copied into the metadata 64B of the snapshot file system 72, e.g., using a copy-on-write technique, so that the snapshot file system 72 retains a copy of the metadata as it was when the instant snapshot was performed.

Figure 7A:
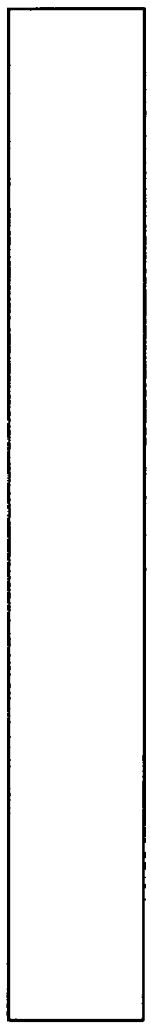
FIGS. 7A-7C illustrate how the metadata for an instant snapshot file system is initially empty, but portions may be copied from the original file system over time.
Figure 7B:
Figure 7C:
Figure 8:
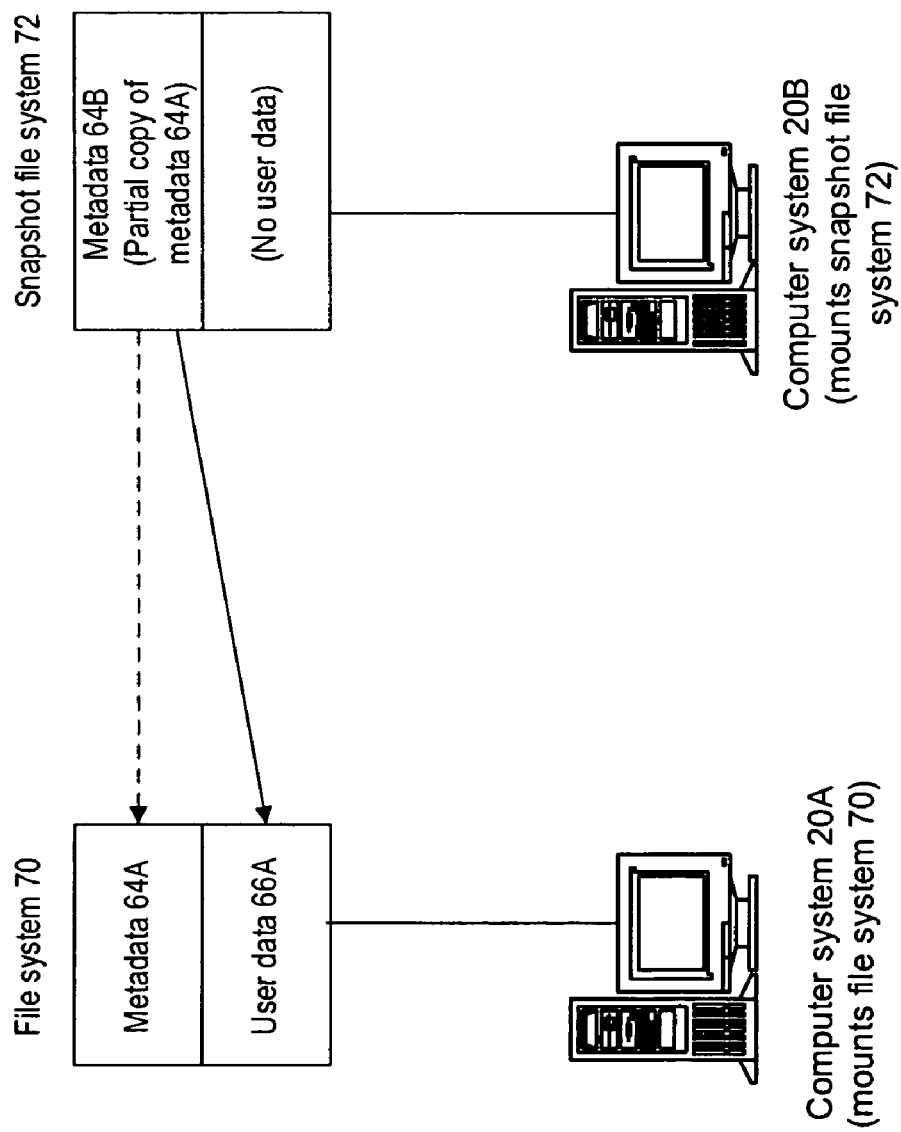
FIG. 8 illustrates the system of FIG. 6, in which the metadata of the instant snapshot file system has a partial copy of the metadata of the original file system as it existed at the time the instant snapshot file system was created.

In some embodiments, metadata may be copied from the metadata 64A in the file system 70 to the metadata 64B in the snapshot file system 72 at the block level. For example, as illustrated in FIG. 7A, when the instant snapshot file system 72 is created, space for metadata 64B for the instant snapshot file system 72 may be allocated, but the space may initially be empty or uninitialized, e.g., may not yet store any metadata. If a write request received through the file system 70 requires a change to a block 42A in the metadata 64A then the block 42A may be copied to the metadata 64B (e.g., may be copied into the space allocated for the metadata 64B) in the snapshot file system 72, as illustrated in FIG. 7B. Similarly, a subsequent change to a block 42B in the metadata 64A (e.g., caused by another write request) may cause the block 42B to be copied to the metadata 64B in the snapshot file system 72, as illustrated in FIG. 7C. Thus, as illustrated in FIG. 8, after performing one or more write operations through the file system 70 after the snapshot file system 72 has been created, the metadata 64B of the snapshot file system 72 may have a partial copy of the metadata 64A as it existed at the time the instant snapshot was performed to create the snapshot file system 72.

The system may store a map table data structure or other information indicating which blocks or portions of metadata have been copied into the metadata 64B of the snapshot file system 72. When a read request is received through the snapshot file system 72, the system may use the map table data structure to determine whether the snapshot file system 72 has metadata corresponding to the requested data, e.g., may determine whether such metadata has previously been copied from the metadata 64A of the file system 70 to the metadata 64B of the snapshot file system 72. If so then the system may read the user data referenced by the corresponding portion of metadata 64B of the snapshot file system 72 and return the user data it references in response to the read request. Otherwise, the system may read the corresponding metadata in the metadata 64A of the file system 70 and return the user data it references in response to the read request. Regardless of whether the metadata 64A of the file system 70 or the metadata 64B of the snapshot file system 72 is used to look up the user data, the user data is read from the user data 66A of the file system 70, since the snapshot file system 72 does not have user data of its own.

As discussed above, in some embodiments, a copy-on-write technique may be utilized to copy blocks (or other organizational units) of metadata from a file system to a snapshot copy of the file system, e.g., so that the original blocks of metadata of the file system are preserved in the snapshot copy of the file system. Thus, the metadata blocks copied into the snapshot copy of the file system reflect the state of the metadata blocks at the time the snapshot copy of the file system was created, and thus indicate where given portions of user data were stored at the time the snapshot copy of the file system was created. As described above, a read request to access a given file through the snapshot copy of the file system may be received, and the metadata blocks copied into the snapshot copy of the file system may be used to read the user data for the file, where the metadata blocks copied into the snapshot copy of the file system reference the storage locations where the user data was stored at the time the snapshot copy of the file system was created. Thus, in some situations, in order to read the correct user data in response to the read request, the user data of the original file system may need to remain at the same storage locations where it was stored at the time the snapshot copy of the file system was created. Thus, in some embodiments, the system may be configured to prevent the user data of the original file system from being reorganized after the snapshot copy of the file system is created. For example, the system may keep track of the fact that the snapshot copy of the file system has been created and may prevent operations that would move user data to new storage locations from being performed. For example, in one embodiment the system may prevent operations such as defragmentation operations, shrink operations, grow operations, or write operations that would cause user data blocks to be moved or reorganized.

As discussed above, when a file system is mounted for writing on one computer system 20 and a snapshot of the file system is mounted for reading on another computer system 20, it may be necessary to copy metadata from the original file system to the snapshot of the file system when the original file system is written to. In one embodiment, the I/O software 180 may implement a software interface that enables a write operation to specify whether the data being written is user data or metadata. Thus, if the write operation specifies that the data is user data then the data is simply written as usual. If, however, the write operation specifies that the data is metadata then the metadata may be copied to the snapshot of the file system before it is changed, as discussed above.

In another embodiment the user data and the metadata may be stored in separate storage areas. For example, in one embodiment, user data for the file system may be stored in one volume, and metadata for the file system may be stored in another volume. Thus, the system can know whether metadata or user data is being written, depending on which volume is being written to.

The system is discussed above in terms of mounting a file system on a first computer system, where the first computer system can read and/or write to the file system, and mounting a snapshot of the file system on a second computer system, where the second computer system can only read from (but not write to) the snapshot of the file system. It is noted that in further embodiments, any number of computer systems may mount respective snapshots of the file system for reading. For example, the file system may be mounted on a first computer system, where the first computer system can read and/or write to the file system, and three different snapshots may be created and mounted on three other computer systems, where the three other computer systems use their respective snapshots for reading user data from the file system, similarly as discussed above.

It is also noted that a given computer system may be operable to both mount a file system for writing and mount a snapshot of another file system for reading. Thus, in a system such as illustrated in FIG. 1, multiple of the computer systems 20 may act as writers, and multiple of the computer systems may act as readers. However, for any given file system there is preferably only one writer.

Although only one computer system 20 at a time may mount a given file system for writing, in some embodiments, the file system may be moved to different computer systems over time. For example, a first computer 20 may mount the file system for writing, and the file system may later be un-mounted from the first computer 20 and re-mounted for writing on a second computer 20. Thus, for example, different computer systems 20 may be selected at different times to host the file system for writing. Any of various criteria may be used to determine which computer system 20 to select for hosting the file system, such as the availability of processor time or various other types of computing resources or characteristics of the available computer systems 20.

Figure 9A:
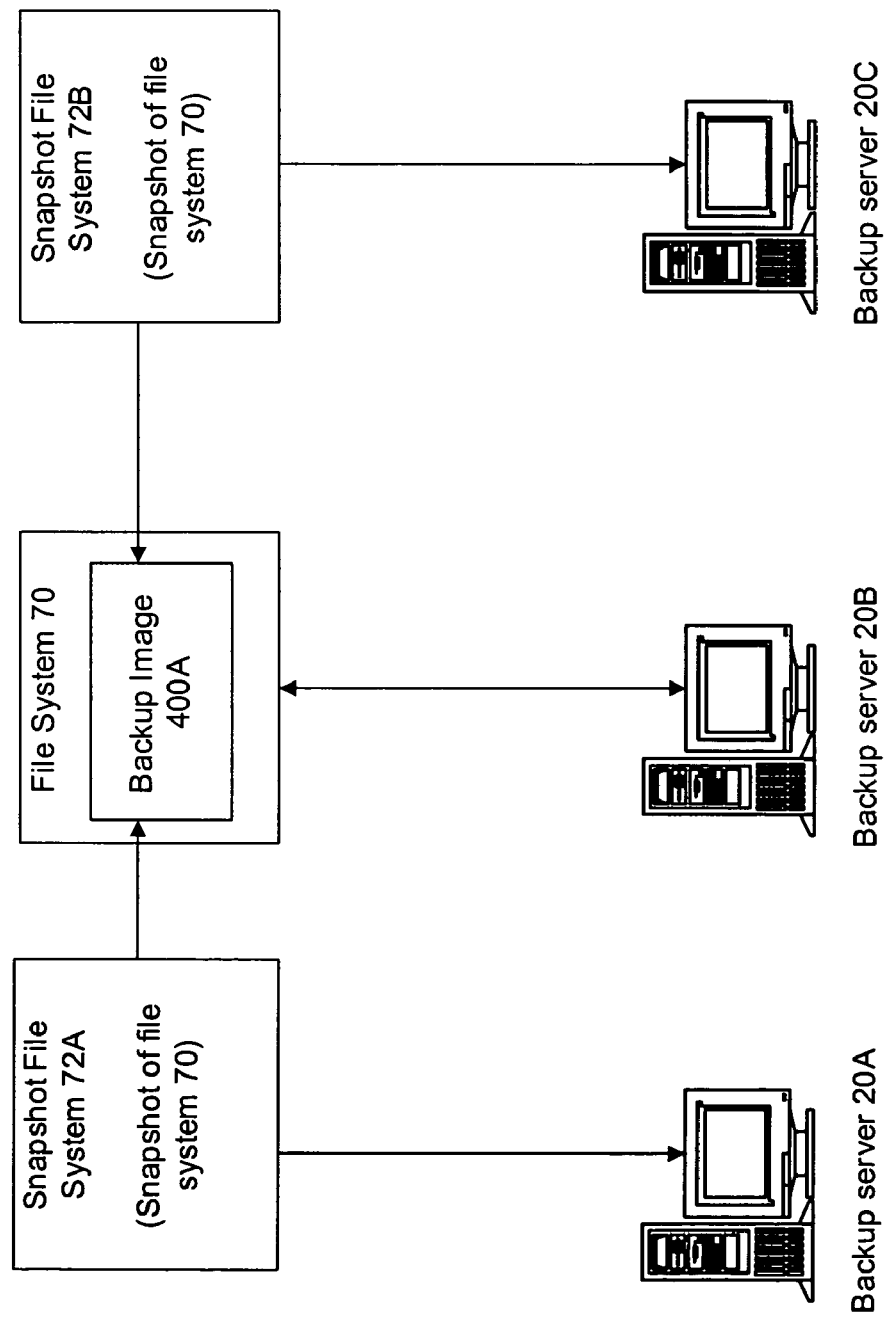
FIGS. 9A and 9B illustrates an example in which one backup server mounts a file system for writing a backup image and other backup servers mount respective snapshot copies of the file system for reading the backup image written by the first backup server.
Figure 9B:
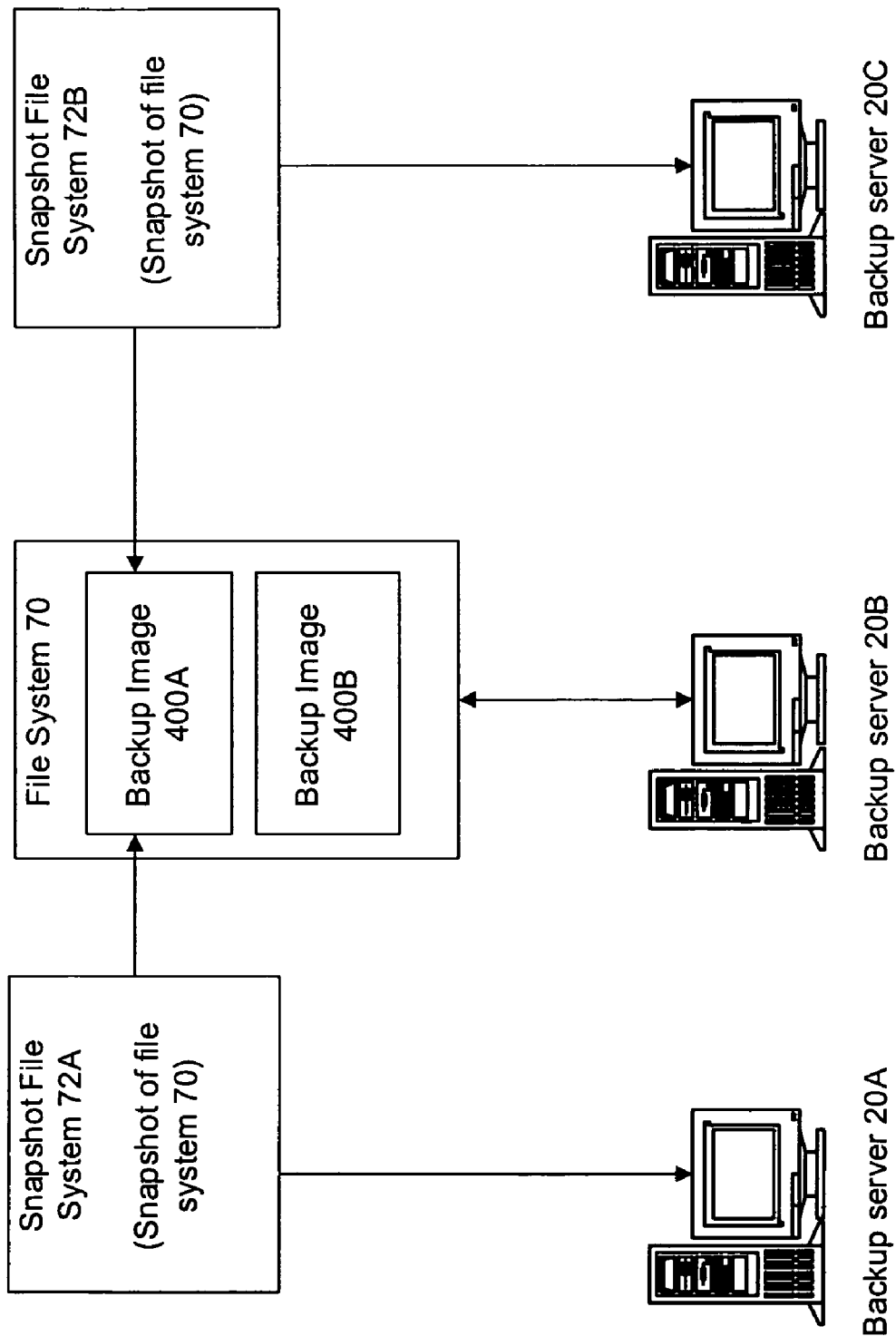

Various embodiments of the system described above may be used in any of various types of applications in which it is desired to mount a file system on multiple host computers. FIGS. 9A and 9B illustrates one example in which the system is used in a backup application, e.g., where the system includes multiple backup server computers for writing new backup images and/or reading existing backup images. In the example of FIG. 9A, a backup server 20B has mounted a file system 70 for writing and has written a backup image 400A, e.g., where the backup image 400A is represented as one or more files in the file system 70. Since the backup image 400A is not expected to change over time, other backup servers can mount snapshot copies 72 of the file system 70 in order to read the backup image 400A at the same time the file system 70 is mounted for writing by the backup server 20B. For example, the backup server 20A has mounted a snapshot file system 72A as a snapshot copy of the file system 70. The snapshot file system 72A may enable the backup server 20A to read the backup image 400A, where the actual user data is read as described above. Similarly, the backup server 20C has mounted a snapshot file system 72B as another snapshot copy of the file system 70. Thus, multiple backup servers 20 can read from the backup image 400A while the file system 70 is mounted for writing on the backup server 20B.

As described above, after the snapshot file systems 72A and 72B have been created, the backup server 20B may still write new data to the file system 70. For example, as shown in FIG. 9B, the backup server 20B has created a second backup image 400B in the file system 70, e.g., where the second backup image 400B is represented as one or more new files. As described above, metadata may be copied from the file system 70 to the snapshot file systems 72A and 72B in response to writing the new files for the second backup image 400B.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
selecting a first computer as a computer on which to mount a file system, wherein the first computer is selected from a plurality of computers based on one or more characteristics of the first computer;
mounting the file system on the first computer, wherein the file system is mounted on the first computer in response to selecting the first computer from the plurality of computers, wherein the file system includes a plurality of backup image files including a first backup image file, wherein the plurality of backup image files are stored at a plurality of storage locations on a storage device, wherein the file system is mounted in order to access the plurality of backup image files stored at the plurality of storage locations on the storage device through the file system and to configure file system software of the first computer to manage metadata of the file system;
creating a snapshot copy of the file system, wherein the snapshot copy of the file system comprises a space allocated for a copy of the metadata of the file system, wherein a first portion of the space is empty, wherein a second portion of the space comprises a partial copy of the metadata of the file system, and wherein a map table indicates which blocks of the metadata of the file system are copied to the space;
mounting the snapshot copy of the file system on a second computer while the file system is mounted on the first computer, wherein the snapshot copy of the file system is mounted in order to access the plurality of backup image files stored at the plurality of storage locations on the storage device through the snapshot copy of the file system and to configure file system software of the second computer to manage metadata of the snapshot copy of the file system;
the file system software of the second computer receiving a read request from a program, wherein the read request comprises a request to access the first backup image file through the snapshot copy of the file system mounted on the second computer while the file system is mounted on the first computer;
the file system software of the second computer reading data from the first backup image file stored at a first set of the plurality of storage locations on the storage device in response to the read request and returning the data to the program;
the file system software of the first computer receiving a write request to write new data to one or more new backup image files through the file system mounted on the first computer while the snapshot copy of the file system is mounted on the second computer;
the file system software of the first computer writing the new data to the one or more new backup image files and modifying the metadata of the file system in response to the write request received by the file system software of the first computer; and
the file system software of the second computer modifying the metadata of the snapshot copy of the file system in response to the write request received by the file system software of the first computer.

2. The computer-implemented method of claim 1, further comprising:
the file system software of the first computer receiving a second read request from a second program, wherein the second read request comprises a request to access the first backup image file through the file system mounted on the first computer while the snapshot copy of file system is mounted on the second computer;
the file system software of the first computer reading the data from the first backup image file stored at the first set of the plurality of storage locations on the storage device in response to the second read request and returning the data to the second program.

3. The computer-implemented method of claim 1, wherein creating the snapshot copy of the file system includes copying the metadata of the file system to the snapshot copy of the file system.

4. The computer-implemented method of claim 3, further comprising:
in response to the read request, reading from the metadata copied to the snapshot copy of the file system in order to determine the first set of the plurality of storage locations at which the data of the first backup image file is stored.

5. The computer-implemented method of claim 1, wherein creating the snapshot copy of the file system does not include copying the metadata of the file system to the snapshot copy of the file system.

6. The computer-implemented method of claim 5, further comprising:
in response to the read request, reading from the metadata of the file system mounted on the first computer in order to determine the first set of the plurality of storage locations at which the data of the first backup image file is stored.

7. The computer-implemented method of claim 5, wherein the write request requires a portion of the metadata of the file system to be changed in order to write the new data to the one or more new backup image files;
wherein said modifying the metadata of the snapshot copy of the file system includes copying the portion of the metadata of the file system into the metadata of the snapshot copy of the file system in response to the write request.

8. The computer-implemented method of claim 1, further comprising:
  in response to the read request, determining whether the snapshot copy of the file system includes metadata corresponding to the data of the first backup image file;
  wherein, upon determining that the snapshot copy of the file system includes metadata corresponding to the data of the first backup image file, said reading the data from the first backup image file is performed using the metadata of the snapshot copy of the file system mounted on the second computer;
  wherein, upon determining that the snapshot copy of the file system does not include metadata corresponding to the data of the first backup image file, said reading the data from the first backup image file is performed using the metadata of the file system mounted on the first computer.

9. The computer-implemented method of claim 1, further comprising:
  un-mounting the file system from the first computer after mounting the file system on the first computer; and
  re-mounting the file system on a third computer.

10. A computer-accessible storage medium storing program instructions executable by one or more processors to implement:
  selecting a first computer as a computer on which to mount a file system, wherein the first computer is selected from a plurality of computers based on one or more characteristics of the first computer;
  mounting the file system on the first computer, wherein the file system is mounted on the first computer in response to selecting the first computer from the plurality of computers, wherein the file system includes a plurality of backup image files including a first backup image file, wherein the plurality of backup image files are stored at a plurality of storage locations on a storage device, wherein the file system is mounted in order to access the plurality of backup image files stored at the plurality of storage locations on the storage device through the file system and to configure file system software of the first computer to manage metadata of the file system;
  creating a snapshot copy of the file system, wherein the snapshot copy of the file system comprises a space allocated for a copy of the metadata of the file system, wherein a first portion of the space is empty, wherein a second portion of the space comprises a partial copy of the metadata of the file system, and wherein a map table indicates which blocks of the metadata of the file system are copied to the space;
  mounting the snapshot copy of the file system on a second computer while the file system is mounted on the first computer, wherein the snapshot copy of the file system is mounted in order to access the plurality of backup image files stored at the plurality of storage locations on the storage device through the snapshot copy of the file system and to configure file system software of the second computer to manage metadata of the snapshot copy of the file system;
  the file system software of the second computer receiving a read request from a program, wherein the read request comprises a request to access the first backup image file through the snapshot copy of the file system mounted on the second computer while the file system is mounted on the first computer;
  the file system software of the second computer reading data from the first backup image file stored at a first set of the plurality of storage locations on the storage device in response to the read request and returning the data to the program;
  the file system software of the first computer receiving a write request to write new data to one or more new backup image files through the file system mounted on the first computer while the snapshot copy of the file system is mounted on the second computer;
  the file system software of the first computer writing the new data to the one or more new backup image files and modifying the metadata of the file system in response to the write request received by the file system software of the first computer; and
  the file system software of the second computer modifying the metadata of the snapshot copy of the file system in response to the write request received by the file system software of the first computer.

11. The computer-accessible storage medium of claim 10, further comprising:
  the file system software of the first computer receiving a second read request from a second program, wherein the second read request comprises a request to access the first backup image file through the file system mounted on the first computer while the snapshot copy of file system is mounted on the second computer;
  the file system software of the first computer reading the data from the first backup image file stored at the first set of the plurality of storage locations on the storage device in response to the second read request and returning the data to the second program.

12. The computer-accessible storage medium of claim 10, wherein creating the snapshot copy of the file system includes copying the metadata of the file system to the snapshot copy of the file system.

13. The computer-accessible storage medium of claim 10, wherein creating the snapshot copy of the file system does not include copying the metadata of the file system to the snapshot copy of the file system.

14. The computer-accessible storage medium of claim 13, wherein the program instructions are further executable by the one or more processors to implement:
  in response to the read request, reading from the metadata of the file system mounted on the first computer in order to determine the first set of the plurality of storage locations at which the data of the first backup image file is stored.

15. The computer-accessible storage medium of claim 13, wherein the write request requires a portion of the metadata of the file system to be changed in order to write the new data to the one or more new backup image files;
  wherein said modifying the metadata of the snapshot copy of the file system includes copying the portion of the metadata of the file system into the metadata of the snapshot copy of the file system in response to the write request.

16. A system comprising:
  a first computer, wherein the first computer is selected from a plurality of computers as a computer on which to mount a file system based on one or more characteristics of the first computer;
  a second computer; and
  one or more storage devices;
  wherein the first computer is configured to mount the file system in response to the first computer being selected from the plurality of computers, wherein the file system includes a plurality of backup image files stored at a plurality of storage locations on the one or more storage devices in order to access the plurality of backup image files through the file system and to configure file system software of the first computer to manage metadata of the file system, wherein the plurality of backup image files includes a first backup image file;

wherein the second computer is configured to mount a snapshot copy of the file system in order to access the plurality of backup image files stored at the plurality of storage locations through the snapshot copy of the file system while the file system is mounted on the first computer and to configure file system software of the second computer to manage metadata of the snapshot copy of the file system, wherein the snapshot copy of the file system comprises a space allocated for a copy of the metadata of the file system, wherein a first portion of the space is empty, wherein a second portion of the space comprises a partial copy of the metadata of the file system, and wherein a map table indicates which blocks of the metadata of the file system are copied to the space;

wherein the file system software of the second computer is configured to receive a read request from a program, wherein the read request comprises a request to access the first backup image file through the snapshot copy of the file system mounted on the second computer while the file system is mounted on the first computer;

wherein the file system software of the second computer is configured to read data from the first backup image file stored at a first set of the plurality of storage locations in response to the read request and return the data to the program;

wherein the file system software of the first computer is configured to receive a write request to write new data to one or more new backup image files through the file system mounted on the first computer while the snapshot copy of the file system is mounted on the second computer;

wherein the file system software of the first computer is configured to write the new data to the one or more new backup image files and modify the metadata of the file system in response to the write request received by the file system software of the first computer; and wherein the file system software of the second computer is configured to modify the metadata of the snapshot copy of the file system in response to the write request received by the file system software of the first computer.

17. The system of claim 16,
wherein the snapshot copy of the file system includes a copy of the metadata of the file system.

18. The system of claim 16,
wherein the snapshot copy of the file system does not include a copy of the metadata of the file system.

\* \* \* \* \*